United States Patent [19]

Okumura

[11] Patent Number: 4,694,611
[45] Date of Patent: Sep. 22, 1987

[54] CONSTRUCTION OF DOOR FRAME IN MOTOR VEHICLE

[75] Inventor: Katsuhiro Okumura, Toyota, Japan

[73] Assignee: Toyota Jidosha Kabushiki Kaisha, Japan

[21] Appl. No.: 765,932

[22] Filed: Aug. 15, 1985

[30] Foreign Application Priority Data

Aug. 24, 1984 [JP] Japan .......................... 59-128069[U]

[51] Int. Cl.$^4$ .......................... E05D 15/16; E06B 7/16
[52] U.S. Cl. .......................... 49/441; 49/374; 49/485; 49/488; 49/502
[58] Field of Search .................. 49/488, 441, 440, 374, 49/375, 227, 485, 484, 502

[56] References Cited

U.S. PATENT DOCUMENTS

| 2,941,838 | 6/1960 | Wernig | 49/374 X |
| 4,457,111 | 7/1984 | Koike | 49/441 |
| 4,494,337 | 1/1985 | Watanabe et al. | 49/374 |
| 4,571,886 | 2/1986 | Shiraishi | 49/440 X |

Primary Examiner—Philip C. Kannan
Attorney, Agent, or Firm—Finnegan, Henderson, Farabow, Garrett & Dunner

[57] ABSTRACT

A construction of a door frame in a motor vehicle, wherein: an end edge of a door glass is brought into sliding contact with a seal member of a guide portion on the side of a door frame produced by rolling a plate member so as to guide the door glass in the vertical direction; a door weatherstrip for sealing a space formed between a door and a vehicle body, when the door is closed, is mounted to the door frame; the door weatherstrip is disposed adjacent the guide portion on the side of a compartment; wall members disposed adjacent to each other, of a channel holding the guide portion and of the door weatherstrip are formed by bending two plate members into a two-ply shape; and a closed section is formed therebetween.

6 Claims, 4 Drawing Figures

CONSTRUCTION OF DOOR FRAME IN MOTOR VEHICLE

BACKGROUND OF THE INVENTION

1. Field of the Invention

This invention relates to a construction of a door frame in a motor vehicle, and more particularly, improvements in the construction of a door frame in a motor vehicle, wherein a door weatherstrip is disposed adjacent a guide portion of a door glass on the side of a compartment.

2. Description of the Prior Art

In a door of a motor vehicle, a door frame typically includes a door weatherstrip for sealing a space formed between the door and a vehicle body when the door is fully closed and a seal member for guiding a door glass in a direction of opening or closing of the door glass and sealing a space formed between a door frame and the door glass when the door glass in fully closed.

In addition, the door weatherstrip and the seal member are oftentimes superposed on each other in the widthwise direction of the vehicle body in order to increase an opening area of the door glass and improve the aesthetic appearance.

For example, the weatherstrip may be disposed adjacent the seal member on the compartment's side.

Further, in many cases, the door frame in the motor vehicle are produced by rolling plate members.

In this case, with the door frame being of the arrangement that the door weatherstrip is disposed adjacent the seal member of the compartment's side, a wall member of the guide portion on the compartment's side for holding the seal member and a wall member of a channel on the outboard side for holding the door weatherstrip utilize a common plate member.

However, if the wall member of the guide portion and the wall member of the channel for holding the door weatherstrip utilize one common plate member, the guide portion and channel are disposed adjacent to each other in the widthwise direction of the vehicle body. As a consequence, the door frame becomes a generally crank-shape in cross section, and the section stiffness, particularly, torsional rigidity thereof is decreased. For example, the door frame is subjected to deformation by a force generated when the door glass is drawn outwardly due to a difference in pressure between the interior and the exterior of the compartment during running of the motor vehicle at high speed for example. Because of this, such disadvantages are presented that the glass run and/or the door weatherstrip are lowered in the sealing performance.

SUMMARY OF THE INVENTION

It is therefore the primary object of the present invention to provide a construction of a door frame in a motor vehicle, wherein, even when a door weatherstrip is held adjacent a guide portion for holding a seal member on the side of a compartment, the construction of a door frame in a motor vehicle has a high torsional rigidity and a low flexible deformation.

To this end, the present invention contemplates that, in a construction of a door frame in a motor vehicle, comprises: an end edge of a door glass which is brought into sliding contact with a seal member of a guide portion on the side of a door frame produced by rolling a plate member so as to guide the door glass in the vertical direction, and a door weatherstrip for sealing a space formed between a door and a vehicle body, when the door is closed, is mounted to the door frame wherein the door weatherstrip is disposed adjacent the guide portion on the side of a compartment, and wherein wall members are disposed adjacent to each other, and define a channel for holding the guide portion and of the door weatherstrip, the wall members are formed by bending two plate members into a two-ply shape, and a closed section is formed therebetween.

To the above end, the present invention contemplates that the guide portion and the channel provide parallel channels to each other with the openings in directions opposite to each other, while wall members are side walls being generally in parallel to the door glass.

To the above end, the present invention contemplates that the wall member of the channel is convexed toward the door weatherstrip and is formed with a stepped portion. The wall member of the guide portion is similarly convexed toward the door weatherstrip and is formed with the stepped portion, the stepped portions are engageable with each other.

To the above end, the present invention contemplates that the closed portion is a generally elongated triangular shape, so that the wall member of the guide portion can function as a bracing to control the deformation of the closed section portion.

To the above end, the present invention contemplates that the length of the door weatherstrip held by the channel in the direction parallel to the door glass is substantially equal to the guide portion.

To the above end, the present invention contemplates that the end edge of the door glass is directly guided in the direction of opening or closing of the door glass by the seal member additionally functioning as the glass run.

To the above end, the present invention contemplates that the end edge of the door glass is mounted thereto with a slider provided at the forward end thereof with a slide portion shifted into the compartment, the slide portion is directly, slidably guided in the vertical direction by the guide portion of the door frame.

According to the present invention, the adjacent wall members for the guide portion which holds the seal member and for the channel which holds the door weatherstrip are formed by the two-ply plate members and the closed section is formed therebetween, whereby the section stiffness is increased, so that the flexible deformation can be controlled. Further, the seal member and/or the door weatherstrip can be prevented from being lowered in the sealing performance due to the aforesaid flexible deformation.

DETAILED DESCRIPTION OF THE PREFERRED EMBODIMENT

Description will be given for preferred embodiments of the present invention with reference to the drawings.

Figure 1:
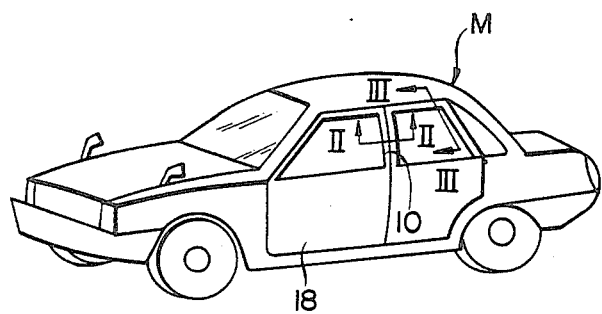
FIG. 1 is a perspective view showing the motor vehicle, to which the present invention is applicable.
Figure 2:
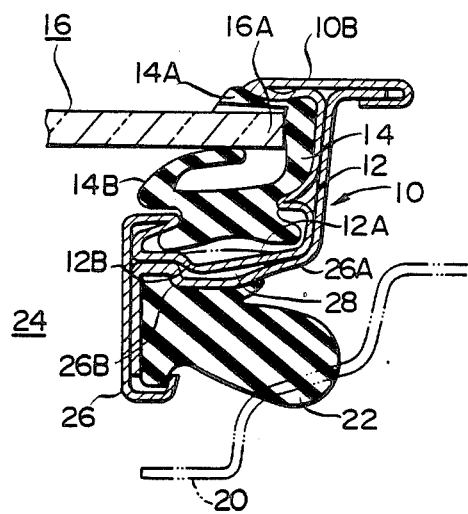
FIGS. 2 and 3 are enlarged sectional views taken along the lines II—II and III—III in FIG. 1, showing an embodiment of the construction of a door frame in a motor vehicle according to the present invention.

As shown in FIGS. 1 and 2, according to this embodiment, in a construction of a door frame in a motor vehicle M, comprising: an end edge 16A of a door glass 16 which is brought into sliding contact with a seal member 14 of a guide portion 12 on the side of a door frame 10 produced by rolling a plate member so as to guide the door glass 16 in the vertical direction; and a door weatherstrip 22 is mounted to the door frame 10 for sealing a space formed between a door 18 and a center pillar 20 of a vehicle body, when the door 18 is closed. The door weatherstrip 22 is disposed adjacent the guide portion 12 on the side of a compartment 24. The wall members 12A and 26A, which are disposed adjacent to each other, are formed by bending two plate members into a two-ply shape, and a closed section 28 is formed therebetween. The wall members 12A and 26A form the guide portion 12 and the channel 26.

The guide portion 12 and the channel 26 are channels being in parallel to each other with the openings thereof facing in directions opposite to each other. The wall members 12A and 26A are side walls being generally in parallel to the door glass 16.

The wall member 26A is convexed toward the door weatherstrip 22 and is formed with a stepped portion 26B. The wall member 12A is similarly convexed toward the door weatherstrip 22 and is formed with the stepped portion 12B. The stepped portion 12B is engageable with the stepped portion 26B.

The seal member 14 is provided with an outer lip 14A slidably contacting the outer surface of the end edge 16A of the door glass 16 and an inner lip 14B slidably contacting the surface of the end edge 16A on the side of the compartment 24, whereby the seal member 14 additionally functions as a door glass run.

Figure 3:
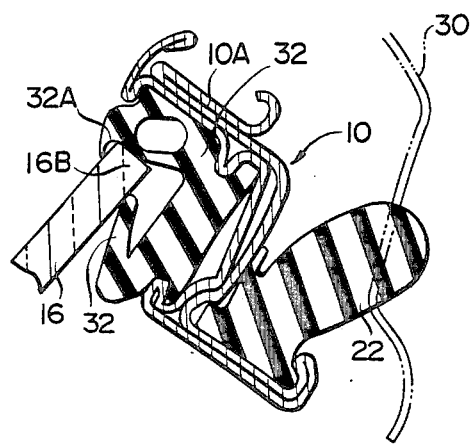

As shown in the embodiment shown in FIG. 3, a seal member 32 is mounted to a top side member 10A of a door frame 10, and includes an inclined side member and a horizontal side member, which are disposed along a roofside rail 30 on the vehicle body's side. The seal member 32 is provided with an outer lip 32A contacting the forward end and outer surface of a top end edge 16B, when the door glass 16 is fully closed, and an inner lip 32B contacting the inner surface of the top end edge 16B, as shown in FIG. 3.

The top side member 10A of the door frame 10 in FIG. 3 is contiguous to a vertical side member 10B shown in FIG. 2 and has a sectional form generally identical with the vertical side member 10B.

In the above embodiment, the wall members 12A and 26A are adjacent to each other along the guide portion 12 for holding the seal member 14. The channel 26 for holding the door weatherstrip 22 is provided adjacent to the guide portion 12 on the compartment's side and is formed of separate plate members. A closed section 28 is formed therebetween, so that a force of resisting a torsional force, etc. acting on the door frame 10, i.e. a torsional rigidity can be increased to a considerable extent.

In the above embodiment, the stepped portion 12B of the wall member 12A and the stepped portion 26B of the wall member 26A are engageable with each other, so that the closed section 28 generally has an elongated triangular shape. Therefore the wall member 12B can function as a bracing to control the deformation of the closed section portion.

As a consequence, for example, even if a force acts to draw the door glass 16 outwardly in the outboard direction, due to the difference in pressure between the exterior and the interior of the compartment during running of the motor vehicle at high speed, no deformation is caused by this force and the sealing performance of seal member 14 and/or the door weatherstrip 22 are not lowered.

Additionally, in the above embodiment, the guide portion 12 and the channel 26 are facing directions opposite to each other and are disposed in parallel to the door glass 16. The length of the door weatherstrip 22 held by the channel 26 in the direction parallel to the door glass 16 is substantially equal to the guide portion 12, so that the door frame 10 can be made compact in size.

Furthermore, in the above embodiment, the end edge 16A of the door glass 16 is directly guided in the direction of opening or closing of the door glass 16 by the seal member 14 additionally functioning as the glass run. The present invention need not necessarily be limited to this, and, for example, the guiding may be performed through a slide piece mounted to the end edge 16A.

Figure 4:
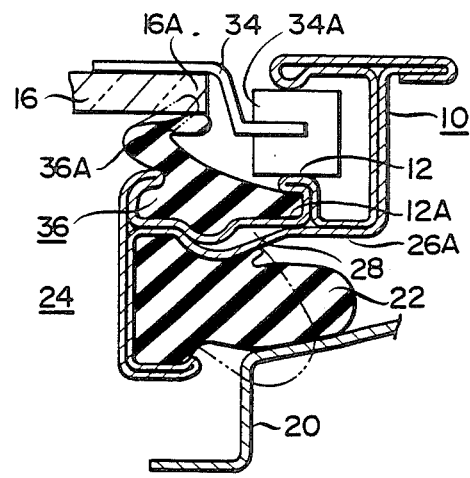
FIG. 4 is a sectional view showing a second embodiment of the present invention, similar to FIG. 2.

Another embodiment is shown in FIG. 4. The end edge 16A of the door glass 16 includes a slider 34 provided at the forward end of the door glass 16 having a slide portion 34A bent toward the compartment 24.

The slide portion 34A is directly, slidably guided in the vertical direction by the guide portion 12 of the door frame 10.

Additionally, the seal member 36 is provided with only the inner lip 36A contacting an inner edge surface of the end edge 16A of the door glass 16.

The second embodiment is identical in other respects with the first embodiment shown in FIG. 2, therefore, same reference numerals are used to designate same or similar parts, so that the detailed description thereof need not be repeated.

In this second embodiment, the slide portion 34A of the slider 34 is shifted into the compartment 24 relative to the door glass 16, so that the center surface of the door glass 16 can be made substantially flush with the outer surface of the door frame 10 to thereby improve the so-called flush-surfacing.

In this second embodiment, the wall member 12A of the guide portion 12 for holding the seal member 36 and the wall member 26A of the channel 26 for holding the door weatherstrip 22 are formed into a two-ply shape in the same manner as in the first embodiment, and the closed section 28 is formed therebetween, so that the section stiffness can be increased to a considerable extent.

In addition, in the above embodiment, the closed section 28 formed between the wall members 12A and 26A has an elongated shape and is substantially parallel to these wall members. The present invention need not necessarily be limited to this, and, the closed section 28 can be elongated, while not interfering with the seal member 14 and/or the door weatherstrip 22.

As a consequence, for example, the wall member 12A may be raised in a direction of the seal member 14 as indicated by a two-dot chain line in FIG. 2, to thereby increase the area of the closed section 28.

What is claimed is:

1. A construction of a vehicle door, comprising:
   a door frame mounted on the vehicle door for slidably supporting a door glass;
   a guide portion formed on said door frame for receiving an end edge of said door glass, said guide portion being substantially vertically disposed along said door frame;

a seal member connected to said guide portion for sealingly engaging said end edge and for guiding said door glass being slidably positioned along said guide portion;

a door weather strip;

a channel formed on said door frame for supporting said door weather strip and for positioning said door weather strip in contact with a vehicle body when the door is closed, said guide portion and said channel being formed of a plate having a substantially two-ply configuration for reinforcing said channel and said guide portion, the two-ply configuration of said plate defining wall members for said channel and said guide portion, said plate also defining an enclosed section formed between said wall members for providing engagement between said wall members to increase the rigidity of said door frame, wherein said enclosed section has a generally elongated triangular shape, so that said wall member of said guide portion engages said wall member of said channel to brace said wall members and thereby control the deformation of said enclosed section.

2. The construction of a vehicle door as set forth in claim 1, wherein said seal member is a glass run for slidably supporting said door glass being directly guided in the direction of opening or closing of said door glass.

3. A construction of a vehicle door, comprising:
a door frame mounted on the vehicle door for slidably supporting a door glass;

a slider positioned at an end edge of said door glass, said slider having a slide portion spaced inward relative to end edge in the direction of a vehicle compartment;

a guide portion extending along said door frame for receiving said slide portion of said slider to guide the door glass in the vertical direction;

a seal member mounted along said guide portion in sliding contact with said door glass;

a door weather strip;

a channel formed on said door frame for supporting said door weather strip and for positioning said door weather strip in contact with a vehicle body when the door is closed, said guide portion and said channel being formed of a plate having a substantially two-ply configuration for reinforcing said channel and said guide portion, the two-ply configuration of said plate defining wall members for said channel and said guide portion, said plate also defining an enclosed section formed between said wall members for providing engagement between said wall members to increase the rigidity of said door frame, wherein said wall member of said channel is convex toward said door weather strip and includes a first stepped portion, said wall member of said guide portion being similarly convex toward said door weather strip and includes a second stepped portion, and said first and second stepped portions are engageable with each other for restricting movement therebetween, and wherein said enclosed section has a generally elongated triangular shape, so that said wall member of said guide portion engages said wall member of said channel to brace said wall members and thereby control the deformation of said enclosed closed section.

4. The construction of a vehicle door as set forth in claim 3, wherein said guide portion and said channel are aligned substantially parallel to provide vertically extending openings facing substantially opposite directions, and said wall members are side walls disposed generally parallel to said door glass.

5. A construction of a vehicle door, comprising:
a door frame mounted on the vehicle door for slidably supporting a door glass;

a guide portion formed on said door frame for receiving an end edge of said door glass, said guide portion being substantially vertically disposed along said door frame;

a seal member connected to said guide portion for sealingly engaging said end edge and for guiding said door glass being slidably positioned along said guide portion;

a door weather strip;

a channel formed on said door frame for supporting said door weather strip and for positioning said door weather strip in contact with a vehicle body when the door is closed, said guide portion and said channel being formed of a plate having a substantially two-ply configuration for reinforcing said channel and said guide portion, the two-ply configuration of said plate defining wall members for said channel and said guide portion, said plate also defining an enclosed section formed between said wall members for providing engagement between said wall members to increase the rigidity of said door frame, wherein said guide portion and said channel are aligned substantially in parallel to provide vertically extending openings facing substantially opposite directions, and said wall members are side walls disposed generally parallel to said door glass, wherein said wall member of said channel is convex toward said door weather strip and includes a first stepped portion, said wall member of said guide portion is similarly convex toward said door weather strip and includes a second stepped portion, and said first and second stepped portions are engageable with each other for restricting movement therebetween, and wherein said enclosed section has a generally elongated triangular shape, so that said wall member of said guide portion engages said wall member of said channel to brace said wall members and thereby control the deformation of said enclosed section.

6. The construction of a vehicle door as set forth in claim 5, wherein said seal member is a glass run for slidably supporting said end edge of said door glass being directly guided in the direction of opening or closing of said door glass.

* * * * *